(No Model.)
C. A. BEMIS & E. A. ADAMS.
AUTOMATIC BICYCLE BELL.
No. 531,457. Patented Dec. 25, 1894.
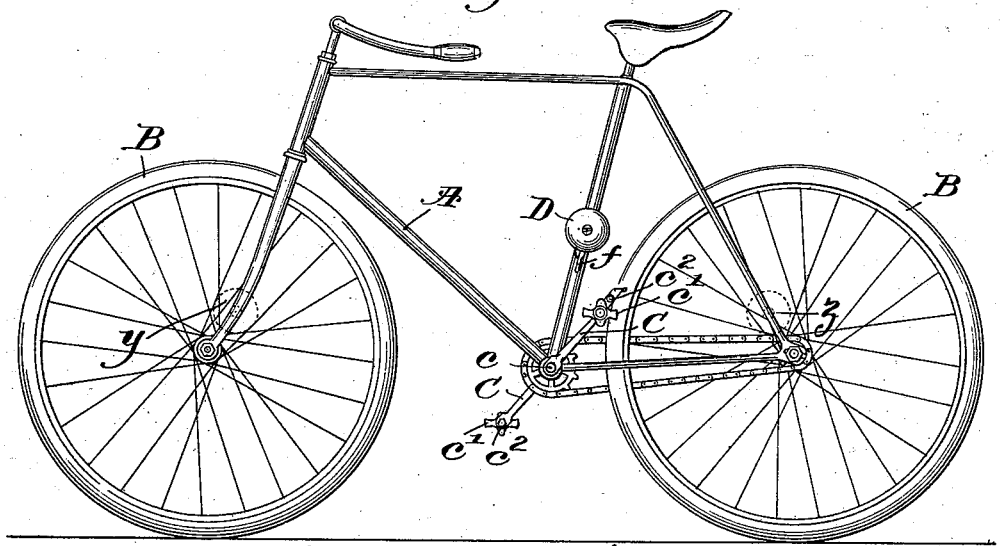
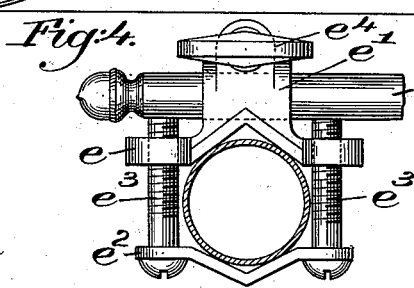
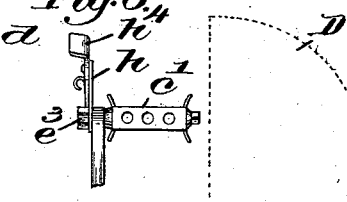
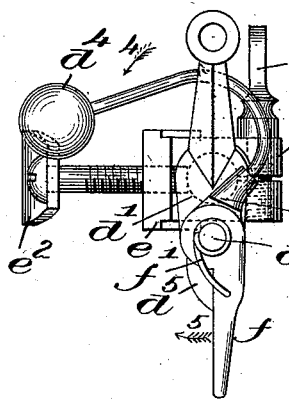
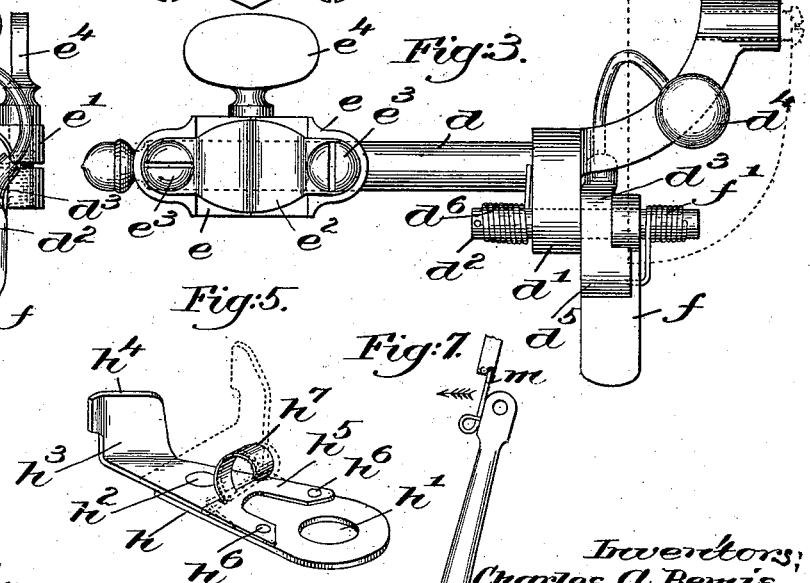
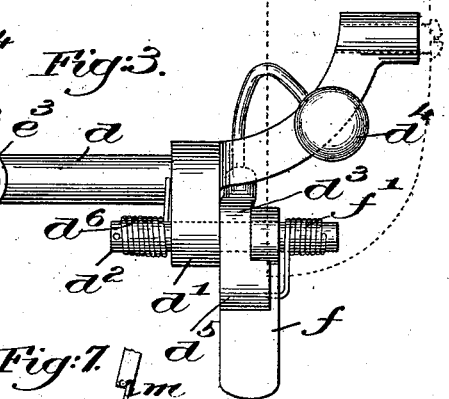
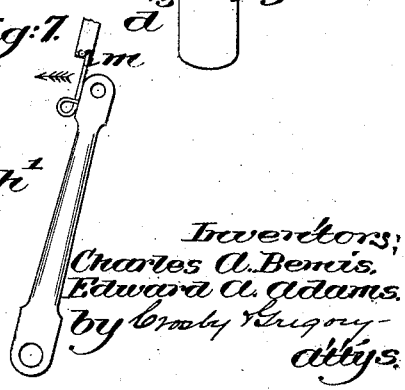
Witnesses.
Edward F. Allen.
Thomas J. Drummond.
Inventors;
Charles A. Bemis.
Edward A. Adams.
by Crosby & Gregory
attys.

UNITED STATES PATENT OFFICE.

CHARLES A. BEMIS AND EDWARD A. ADAMS, OF WEST MEDWAY, MASSACHUSETTS.

AUTOMATIC BICYCLE-BELL.

SPECIFICATION forming part of Letters Patent No. 531,457, dated December 25, 1894.

Application filed January 2, 1894. Serial No. 495,397. (No model.)

*To all whom it may concern:*

Be it known that we, CHARLES A. BEMIS and EDWARD A. ADAMS, of West Medway, county of Norfolk, State of Massachusetts, have invented an Improvement in Automatic Alarms for Bicycles and the Like, of which the following description, in connection with the accompanying drawings, is a specification, like letters on the drawings representing like parts.

This invention has for its object to provide an automatic alarm for bicycles and the like.

In accordance with this invention the audible alarm, preferably a bell, is attached to the bicycle frame in position with its actuator projecting into the path of movement of and to be engaged by one or both of the cranks or other moving part of the bicycle, or by some suitable device carried by said cranks or moving part, as will be more fully hereinafter described.

The device is preferably so constructed that the alarm is sounded when the bicycle is moved in one direction only.

In the drawings, Figure 1 represents in side elevation a bicycle of usual construction equipped with an audible alarm embodying this invention. Fig. 2 is a detail looking at the end of the alarm mechanism with the bell or gong removed; Fig. 3, a top view of Fig. 2; Fig. 4, a top view of the left hand end of Fig. 3 showing the clamping device by which to secure the alarm to the frame of the machine; Fig. 5, a perspective detail showing the preferred form of actuating finger with its movable end and locking device therefor; Fig. 6, a side view showing the preferred manner of attaching the actuating finger to the crank, and Fig. 7, a modification to be referred to.

In the drawings we have shown, and in the following specification shall particularly describe our invention as embodied in the form of a bell, that being the preferred form of audible alarm.

A represents the frame and B, B, the wheels of a crank propelled vehicle, shown as a bicycle, the cranks in the present instance being shown at C, C, fast on the crank shaft $c$ journaled in suitable bearings in said frame, said cranks being fitted with usual pedals $c'$ journaled on the crank pins $c^2$ secured to the said cranks by means of usual nuts $c^3$ threaded upon the ends of said pins at the inner sides of the cranks.

In accordance with this present invention the audible alarm device, shown as a bell D, is mounted upon a suitable support, shown as a post $d$, secured to the frame in usual manner.

In the present construction we have shown the bell-supporting post $d$, which constitutes a bell support, as held in a split sleeve $e'$ on the member $e$ of a clamping device composed of the said member $e$ and a companion member $e^2$, preferably V-shaped, as shown in Fig. 4, and clamped together, spanning and gripping one of the bars of the frame by means of clamping screws $e^3$. A thumb screw $e^4$ furnishes means by which to vary the grip of the sleeve $e'$ upon the member $d$, the latter being made adjustable longitudinally as well as rotatably in said sleeve by loosening the said thumb screw.

The support $d$ has a short side arm $d'$ in which is journaled a pin $d^2$ fast on which is the hub $d^3$ of the striker $d^4$, said pin and striker being acted upon by a coiled spring $d^6$, which tends to move it to the left in the direction of arrow 4, Fig. 2. The hub $d^3$ has a tail piece $d^5$ which stands in position directly in front of the actuator $f$, also loosely journaled on the said pin $d^2$ and acted upon by a coiled spring $f'$ which tends to move it to the left Fig. 2, in the direction of the arrow 5 against the tail piece $d^5$. The actuator $f$ stands in the path of movement of the finger $h$ attached to one of the cranks, said finger, as herein shown, consisting of a thin metallic plate $b$ provided with a hole $h'$ which permits the said finger to be slipped upon one of the crank pins $c^2$ and be clamped thereon by the nut $c^3$ referred to. See Fig. 6. To the outer end of this finger we prefer to pivot at $h^2$ a movable end piece $h^3$, inturned, as shown, to present an acting face $h^4$, the squared edges of the said end piece co-operating with a metallic spring plate $h^5$ attached to the finger by rivets or screws $h^6$, see Fig. 5, and provided with a finger piece $h^7$ by which it may be drawn out into its dotted position to permit the end-piece $h^3$ to be turned back into its dotted position, as shown.

The spring $h^5$ constitutes one form of locking device for the movable end-piece for the finger.

The operation of our device is as follows, viz:—The audible alarm being fixed in position shown in Fig. 1, its actuator $f$ will be engaged by the finger on the crank at each rotation of the latter and moved to the left a short distance and then released to permit the spring $d^6$ to throw the striker against the bell and sound the same, this sounding of the bell or alarm being repeated at each rotation of the cranks while the bicycle is moving in a forward direction. When the bicycle is moved in an opposite or rearward direction the finger striking the actuator $f$ from the left, Figs. 1 and 2, simply turns the said actuator about its pivot $d^2$ until it is passed, when the said actuator is immediately returned to its position Fig. 2 by the spring $f'$, the finger thus operating to sound the alarm only when the machine is moving forward, said finger simply clicking past the actuator without sounding the alarm when the machine is moved backward. When it is desired to throw the alarm out of operation the end-piece $h^3$ of the finger $h$ may be turned into its dotted position, Fig. 5, so that it will not engage the actuator $f$ during rotation of the cranks, or the thumbscrew $e^4$ of the clamp may be slackened to permit the support $d$ to be rotated in said clamp to turn the bell or alarm up into a position where it will not be actuated by the finger on the crank.

Instead of mounting the bell above the path of the pedals we may mount it below the path of the pedals with the actuator pointed up instead of down.

The audible alarm need not necessarily be placed always in one position, for any position which will bring it into proper relation to the moving part which will sound it will suffice so far as this invention is concerned.

It is, of course, evident that the pawl $f$ may be upon the crank finger as well as upon the bell actuator, as may be found most convenient, involving simply the reversal of the parts shown.

In place of a pivoted pawl we may employ a coiled spring, $m$ see Fig. 7, wherein the said spring constitutes the finger to be applied to the crank and free to turn in the direction of the arrow to click past the bell-actuator, but restrained from such movement in an opposite direction by the crank itself.

While we prefer to apply the alarm to the frame in such position that it may be sounded from the cranks, yet said alarm may be attached to other parts of the frame, as for example, as shown in dotted lines at $y$ and $z$, and actuated from the wheel hubs or from some other moving part of the vehicle.

The term "actuator" as used in the claims embraces any device movement of which causes the alarm, whatever be the character of the latter, to be sounded, and while we prefer to employ a bell for the audible alarm, yet our invention is not restricted in this respect, as any other known form or kind of audible alarm may be used if desired, all without departing from the spirit and scope of the invention.

By the use of our improved automatic alarm, sounded at stated intervals while the bicycle is in motion, pedestrians and others are enabled by the sounding of the alarm to determine the distance of the bicycle from him, the direction and the rate of speed at which it is moving, gradually increasing loudness and rapidity of the soundings indicating an approach of the bicycle at a rapid rate of speed.

The bicycle cannot be stolen without sounding of the alarm to notify the owner.

The invention is not limited to the particular construction herein shown, for it is evident the same may be varied without departing from the scope of the invention.

It is evident that the safety of the rider is enhanced by an alarm like that forming the subject matter of this invention, for it clears the way and prevents running into obstacles which would tend to overturn him.

We claim—

1. In a crank propelled vehicle, the combination with an audible alarm and an actuator therefor, of propelling cranks for the vehicle, provided with pivoted treadles, and a removable finger clamped to one of said cranks by the treadle-pivot thereon, and adapted to engage and move said actuator at each rotation of the said cranks, substantially as described.

2. In a crank-propelled vehicle, the combination with an audible alarm, of an actuator, and a pawl thereon co-operating with and to be engaged by the cranks to sound the alarm during rotation of the latter in one direction only, substantially as described.

3. In a vehicle, the combination with a frame, a bell and its actuator adapted to be engaged and moved by a moving part of the vehicle, of a support for said bell, and a clamp adapted to be secured to said frame and in which said support is adjustably mounted, substantially as described.

4. In a crank propelled vehicle, an audible alarm and its actuator, combined with a finger, a movable end-piece attached thereto and adapted to be moved into operative or inoperative position, and a locking device for said end piece, substantially as described.

In testimony whereof we have signed our names to this specification in the presence of two subscribing witnesses.

CHARLES A. BEMIS.
EDWARD A. ADAMS.

Witnesses:
JOHN P. HUNT,
CHLOE A. PARTRIDGE.